US009901996B2

(12) United States Patent
Grosvold et al.

(10) Patent No.: US 9,901,996 B2
(45) Date of Patent: Feb. 27, 2018

(54) TUBE CUTTING DEVICE AND METHOD OF USING THE SAME

(71) Applicant: TRANE INTERNATIONAL INC., Piscataway, NJ (US)

(72) Inventors: Steven M. Grosvold, La Crosse, WI (US); Nels J. Ebbesen, Winona, MN (US); John A. Lochen, Rockland, WI (US); Robert R. Crader, Mindoro, WI (US); Steven M. Oien, Galesville, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 622 days.

(21) Appl. No.: 14/139,182

(22) Filed: Dec. 23, 2013

(65) Prior Publication Data

US 2014/0174269 A1    Jun. 26, 2014

Related U.S. Application Data

(60) Provisional application No. 61/745,166, filed on Dec. 21, 2012.

(51) Int. Cl.
*B23D 21/08* (2006.01)
*B26D 3/16* (2006.01)

(52) U.S. Cl.
CPC .............. *B23D 21/08* (2013.01); *B26D 3/164* (2013.01); *Y10T 83/0596* (2015.04)

(58) Field of Classification Search
CPC ........ B26D 3/164; B26D 3/166; B23D 21/00; B23D 21/04; B23D 21/06; B23D 21/08; B23D 21/10; Y10T 83/384; Y10T 83/386; Y10T 83/9403; Y10T 83/0596; Y10T 29/49995; Y10T 29/49998
USPC ...................... 30/93, 94, 102, 104, 105, 108
See application file for complete search history.

(56) References Cited

U.S. PATENT DOCUMENTS

| 514,985 | A |  | 2/1894 | Albert et al. |
|---|---|---|---|---|
| 594,081 | A | * | 11/1897 | Hervey ................ B23D 21/145 30/105 |
| 646,907 | A |  | 4/1900 | Henrikson |
| 700,118 | A | * | 5/1902 | Hathorn ................ B23D 21/14 30/92 |
| 700,197 | A | * | 5/1902 | Hervey ................ B23D 21/145 30/104 |
| 1,835,651 | A |  | 12/1931 | Ihsen |
| 2,356,402 | A |  | 8/1944 | Haynes |
| 2,764,812 | A |  | 10/1956 | Thornson |
| 2,821,781 | A | * | 2/1958 | Zeiler ................ B23D 21/145 30/102 |
| 2,869,413 | A |  | 1/1959 | Anderson |

(Continued)

*Primary Examiner* — Stephen Choi
*Assistant Examiner* — Evan Macfarlane
(74) *Attorney, Agent, or Firm* — Hamre, Schumann, Mueller & Larson, P.C.

(57) ABSTRACT

A tube cutting device includes a tube holding member that holds a target tube from an inside of the target tube, allowing the target tube to be cut from an outside; and a cutter carrier member that includes a cutter eccentrically pivotable relative to the geometry axis of an elongate body of the cutter carrier member, such that when in a non-extended position, the cutter is positioned within a diameter of the elongate body, and when in an extended position, the cutter extends outwardly and cuts into a wall of the target tube.

16 Claims, 4 Drawing Sheets

(56) References Cited

U.S. PATENT DOCUMENTS

| | | | |
|---|---|---|---|
| 3,315,355 A | | 4/1967 | Osburn et al. |
| 4,294,011 A | | 10/1981 | Kemme |
| 4,958,434 A | | 9/1990 | Marschner |
| 5,022,155 A | * | 6/1991 | Hockett .................. B26D 3/169 30/93 |
| 5,210,949 A | | 5/1993 | Hockett |
| 5,592,741 A | * | 1/1997 | Vassar .................... B23D 21/08 30/101 |

\* cited by examiner

US 9,901,996 B2

TUBE CUTTING DEVICE AND METHOD OF USING THE SAME

FIELD

This disclosure relates generally to a device for cutting tubes, and particularly, but not by way of limitation, to a field service device for cutting tubes.

BACKGROUND

Tubing is widely used in industries for conveying liquids and gases of all types and is convenient for use in construction and other environments. For example, copper evaporator tubes are typically used in chillers because it is easily bendable and may be formed to fit into the space that may be available. Tube cutters are used to cut damaged copper evaporator tubes to remove rough edges of the tubes, thereby allowing the copper tubes to be pulled through a tubesheet, and subsequently removed and replaced in the field.

SUMMARY

In some embodiments, a tube cutting device includes a tube holding member that holds a target tube from an inside of the target tube, allowing the target tube to be cut from an outside, and a cutter carrier member that includes a cutter eccentrically pivotable relative to the geometry axis of an elongate body of the cutter carrier member, such that when in a non-extended position, the cutter is positioned within a diameter of the elongate body, and when in an extended position, the cutter extends outwardly and cuts into a wall of the target tube. The tube holding member and the cutter carrier member can have generally the same diameter which allows each of the tube holding member and the cutter carrier member to extend through tube holes of a tubesheet.

A method for cutting a tube includes extending a tube holding member through a tube hole of a tubesheet; advancing the tube holding member into a target tube; holding on an inner surface of the target tube by the tube holding member; extending a cutter carrier member through a tube hole of a tubesheet; extending the cutter such that the cutter extends outwardly from an elongate body of the cutter carrier member; and cutting the target tube. Each of the tube holding member and the cutter carrier member have a diameter which allows each of the tube holding member and the cutter carrier member to extend through tube holes of a tubesheet.

This Summary is an overview of some of the teachings of the present application and not intended to be an exclusive or exhaustive description of the claimed invention. Further details about the present subject matter are found in the detailed description and appended claims. Other aspects of the subject matter will be apparent to persons skilled in the art upon reading and understanding the following detailed description and viewing the drawings that form a part thereof, each of which are not to be taken in a limiting sense. The scope of the claimed invention is defined by the appended claims and their equivalents.

DESCRIPTION OF THE DRAWINGS

The drawings, which are not necessarily drawn to scale, illustrate generally, by way of example, but not by way of limitation, various embodiments discussed in this application.

Like reference symbols in the various drawings indicate like elements.

DETAILED DESCRIPTION

Figure 1:
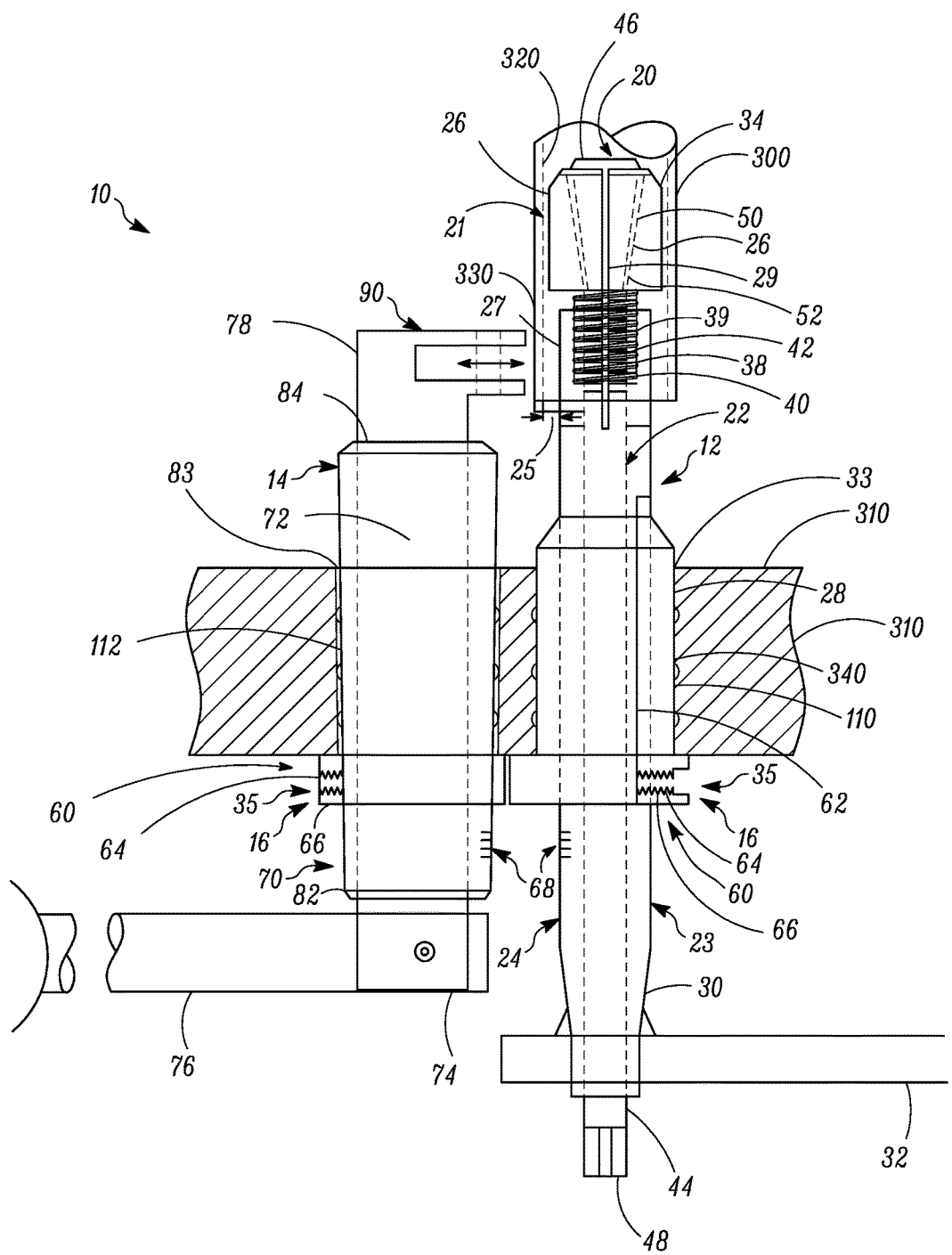
FIG. 1 is a side view of an embodiment of a tube cutting device.
Figure 2:
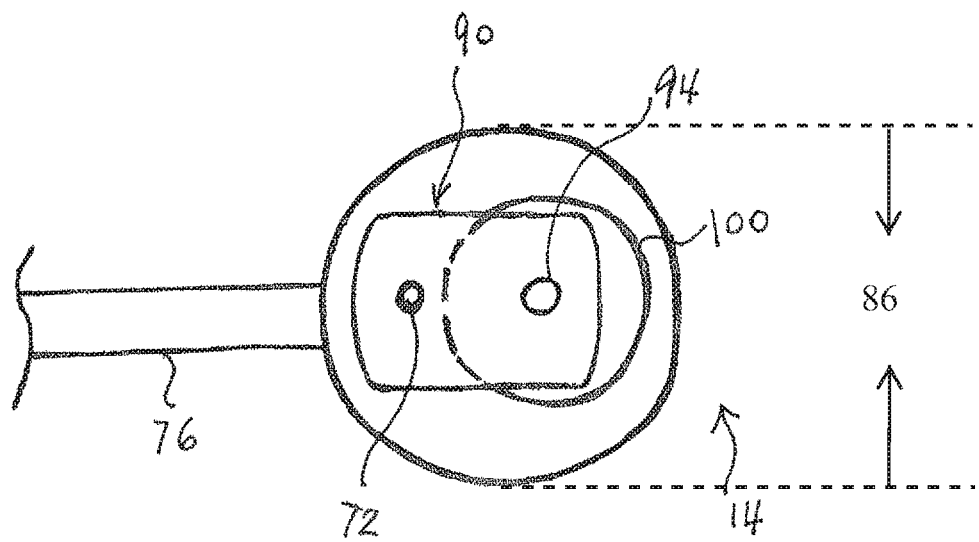
FIG. 2 is a top view of a cutter holding member of the tube cutting device of FIG. 1, with a cutting wheel holder being in a non-extended position.
Figure 3:
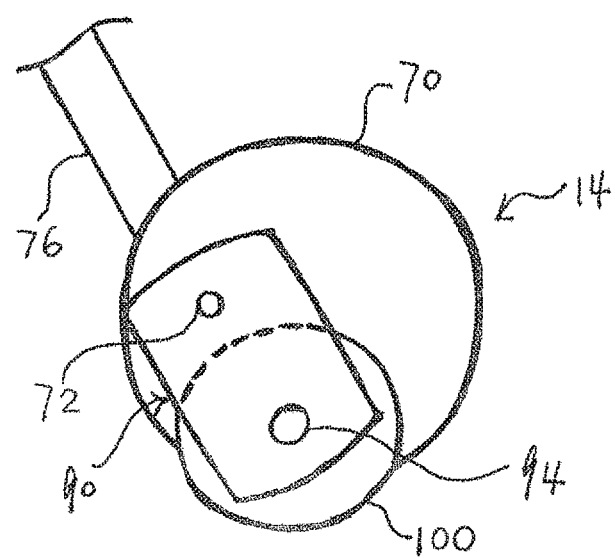
FIG. 3 is a top view of the cutter holding member of FIG. 2, with the cutting wheel holder being moved to a position between the non-extended position and an extended position.
Figure 4:
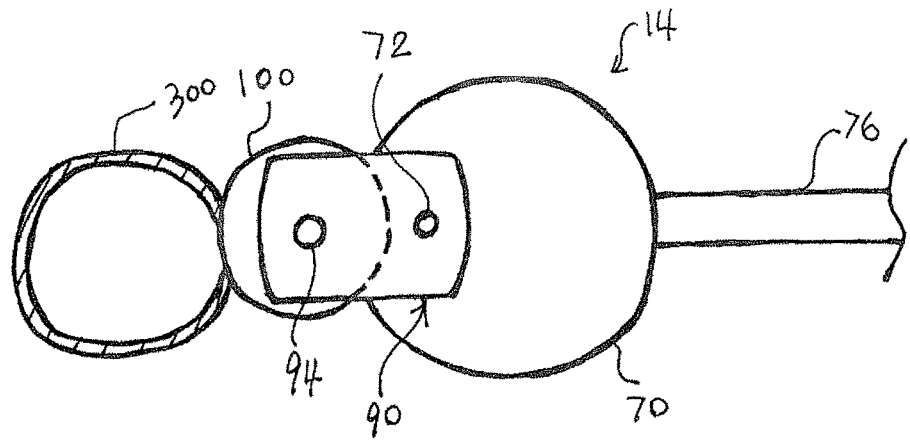
FIG. 4 is a top view of the cutter holding member of FIG. 2, with the cutting wheel holder being in the extended position.
Figure 5:
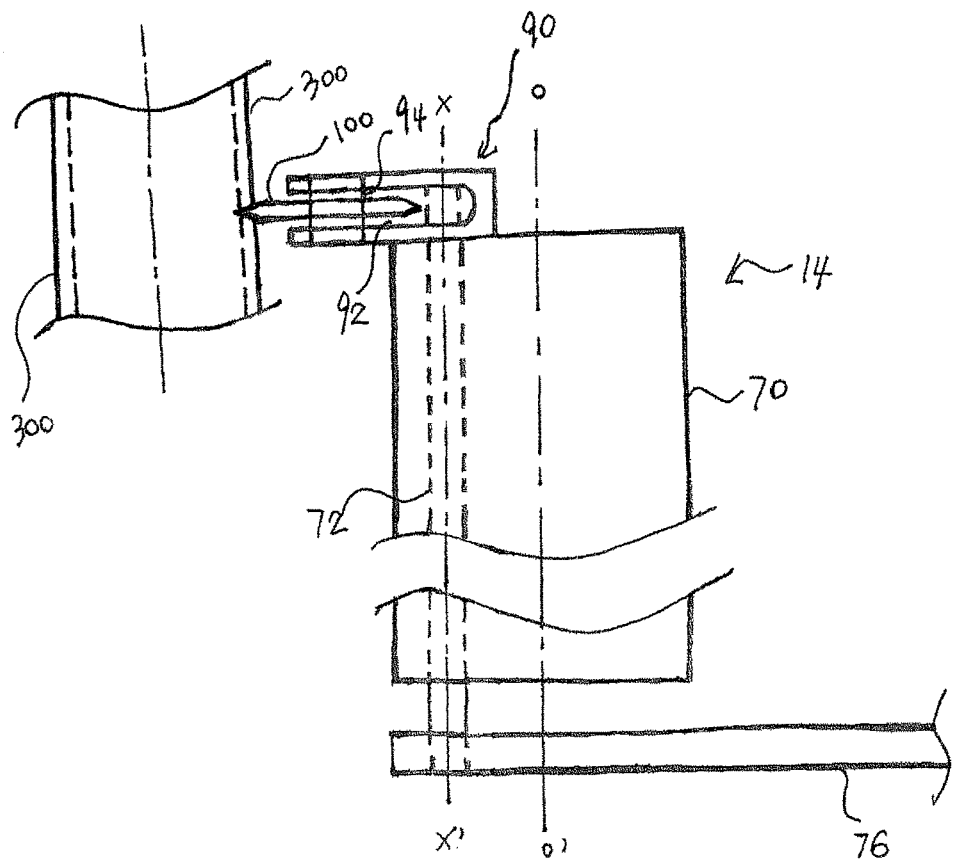
FIG. 5 is a side view of the cutter holding member of FIG. 2, with the cutting wheel holder being in the extended position.
Figure 6:
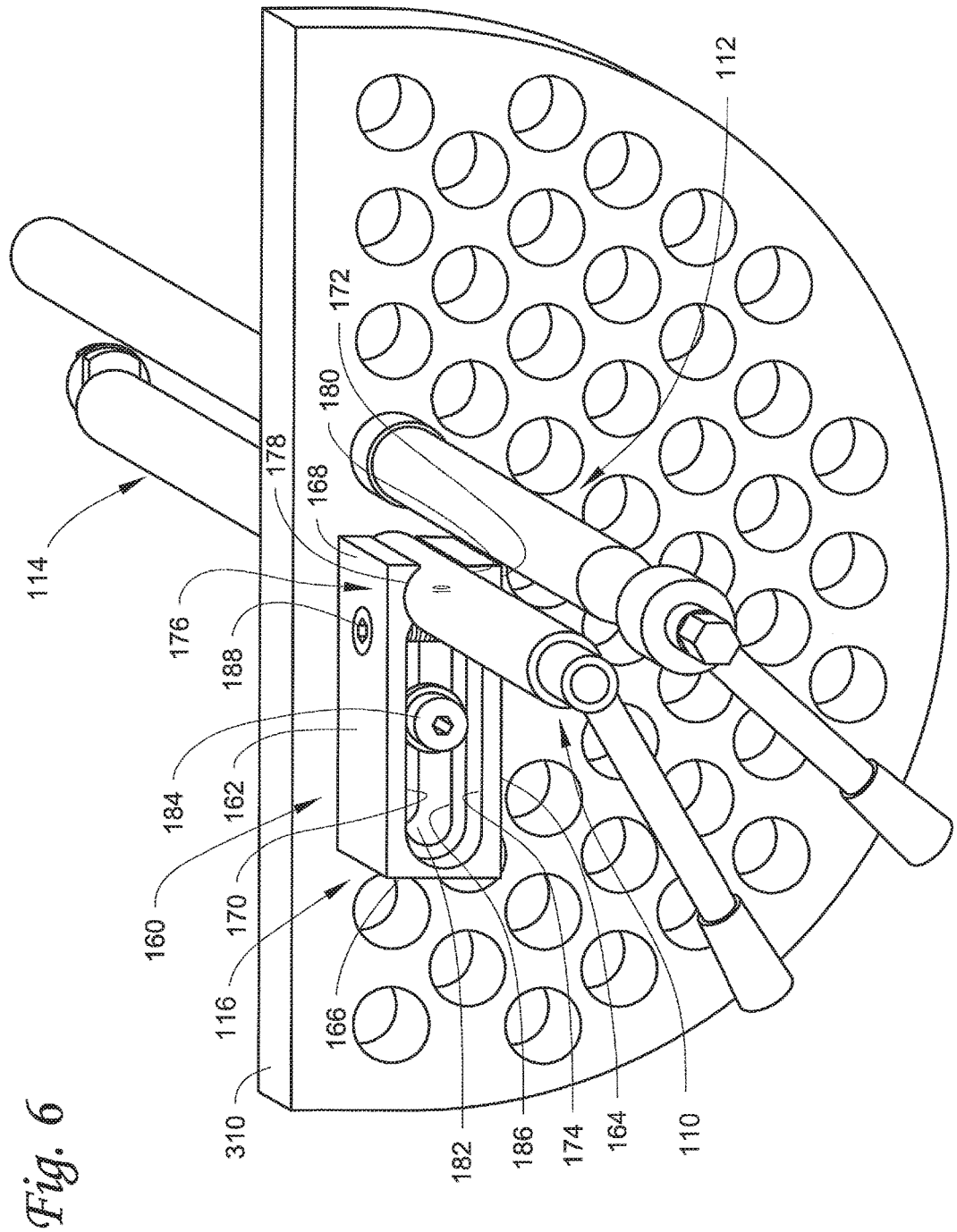
FIG. 6 is a perspective view of another embodiment of the tube cutting device, including an adjustable bracket.

Referring to FIGS. 1 and 5-6, a tube cutting device 10 can be configured to cut, for example, a damaged tube (target tube) 300 in a work field, thereby allowing the target tube 300 to be pulled out through a tubesheet 310. In some embodiments, the tube cutting device 10 can be used to cut damaged tubes used in HVAC chillers. The tube cutting device 10 facilitates removal of the target tube 300 in the work field. The term "target tube" generally refers to a tube in a work field, for example, any damaged heat exchanger shell tube, which is subjected to cutting by the tube cutting device 10.

Referring to FIGS. 1 and 5-6, the tube cutting device 10 can in some embodiments include a tube holding member 12 for holding the target tube 300 static during cutting, a cutter carrier member 14 for carrying a cutter which in some embodiments takes a form of a cutting wheel 100 and maintaining the cutting wheel 100 in place during cutting. In some embodiments, the tube cutting device 10 can include one or more retention members 16 for retaining the tube holding member 12 or the cutter carrier member 14 in place with the tubesheet 310 and limiting axial movement of the tube holding member 12 and the cutter carrier member 14.

Referring to FIG. 1, the tube holding member 12 can include a centrically arranged expanding mandrel 20, a rotation rod 22 that supports the expanding mandrel 20, an expanding sleeve 24 having a plurality of spaced apart clamping elements 26 that interact with the expanding mandrel 20, and a positioning sleeve 28 which can be secured to the tubesheet 310 during cutting.

Still referring to FIG. 1, the expanding sleeve 24 includes a head section 21 and a body section 23. The body section 23 has a smaller diameter than the head section 21 to provide a clearance 25 between an outer surface 27 of the expanding sleeve 24 and the inner surface 320 of the target tube 300, when the expanding sleeve 24 is inserted into the target tube 300. This clearance 25 allows a wall 330 of the target tube 300 to be cut through while avoiding damaging the outer surface 27 of the expanding sleeve 24.

The expanding sleeve 24 also includes a proximal end 30 connected to a handle 32 for rotating the expanding sleeve 24, a distal end 34 opposite to the proximal end 30, and the plurality of spaced apart clamping elements 26 located at the distal end 34 of the expanding sleeve 24. The expanding sleeve 24 also includes inner threads 38 formed on an inner surface 39 of the sleeve 24 and located on a portion of the body section 23 adjacent to the head section 21. A gap 29 can be formed between each two adjacent clamping elements 26. The gap 29 extends from the distal end 34 through the threaded section and ends at a location slightly beyond the threaded section.

The spaced apart clamping elements 26 can be positioned between a clamped position and an unclamped position. When the expanding mandrel 20 is not interacting with the clamping elements 26, the clamping elements 26 are in an unclamped position. When the expanding mandrel 20 acts on the clamping elements 26, the clamping elements 26 are pushed outwardly in a clamped position by clamping on an inner surface of the target tube 300. The expanding mandrel 20 has at least one wedge surface 50 interactable with counterwedge surfaces 52 formed on the clamping elements 26.

The rotation rod 22 includes a proximal end 44 extending through and projecting beyond the proximal end 30 of the expanding sleeve 24, a distal end 46 located opposite to the proximal end 44, and outer threads 40 which cooperate with the inner threads 38 formed on the inner surface 39 of the expanding sleeve 24. The outer threads 40 are formed on the outer surface 42 of the rotation rod 22 and located on a portion of the rotation rod 22 that is adjacent to the expanding mandrel 20.

In some embodiments, the tube holding member 12 includes a rotation mechanism 48 for rotating the rotation rod 22. In the depicted embodiment as shown in FIG. 1, the rotation mechanism 48 is located at the proximal end 44 of the rotation rod 22 and can take a form of a six sided hex nut that can be rotated by a tool, for example, a wrench, which allows an operator to apply a rotational torque to the rotation rod 22. However, it is to be understood that the rotation mechanism 48 can also be in other forms as long as it can cause the rotation rod 22 to rotate. The expanding mandrel 20 is supported on the distal end 46 of the rotation rod 22.

Still referring to FIG. 1, the positioning sleeve 28 is sized to have a snug fit leaving a slight clearance 33 with one of the tube holes 340 of the tubesheet 310. The expanding sleeve 24 extends through the positioning sleeve 28 and is received snugly by the positioning sleeve 28. In some embodiments, the outer diameter of the positioning sleeve 28 is sized to allow the positioning sleeve 28 to have a snug fit leaving a slight clearance 33 with one of the tube holes 340. The positioning sleeve 28 can also include the retention member 16 for retaining the tube holding member 12 and/or the cutter carrier member 14 in place with the tubesheet 310 and limiting axial movement of the tube holding member 12 and the cutter carrier member 14. In the embodiment as shown in FIG. 1, the retention member 16 takes the form of a shoulder 35 configured to limit axial movement of the positioning sleeve 28 toward the distal end 34 of the expanding sleeve 24. The shoulder 35 can be formed integrally with the positioning sleeve 28, or separately from the positioning sleeve 28 and secured to the positioning sleeve 28 by a fastener.

Still referring to FIG. 1, the tube holding member 12 can also include a locking mechanism 60 for preventing movement of the expanding sleeve 24 relative to the positioning sleeve 28. In some embodiments, the locking mechanism 60 can be configured to prevent movement of the expanding sleeve 24 relative to the shoulder 35, and in turn prevent movement of the expanding sleeve 24 relative to the positioning sleeve 28.

In some embodiments, the locking mechanism 60 can take a form of a threaded aperture 64. The threaded aperture 64 can be defined transversely in the shoulder 35 or in the positioning sleeve 28 to receive a fastener 66, such as a screw, that secures the shoulder 35 or the positioning sleeve 28 to the expanding sleeve 24. In other embodiments, the locking mechanism 60 can also include a groove 62 extending axially on the outer surface 27 of the expanding sleeve 24 to allow the fastener 66, such as a screw, to be more securely tightened against the groove 62. It is to be understood that other types of locking mechanisms can also be used to prevent movement of the expanding sleeve 24 relative to the shoulder 35 or the positioning sleeve 28.

By screwably tightening the rotation mechanism 48, the rotation rod 22 travels axially toward the proximal end 30 of the expanding sleeve 24 as the rotation rod 22 rotates, thereby drawing the expanding mandrel 20 toward the proximal end 30 of the expanding sleeve 24. The wedge surface 50 of the expanding mandrel 20 subsequently presses against the counterwedge surfaces 52 of the clamping elements 26, causing the clamping elements 26 to be forced radially outwardly with the axial movement of expanding mandrel 20 to bear against an inside of the target tube 300 and clamp the tube 300. The target tube 300 is held thereby against a translational movement as well as against a rotary movement.

Referring to FIGS. 1-5, the cutter carrier member 14 includes an elongate cylindrical body 70, a rotation shaft 72 axially extending through the cylindrical body 70, and a handle 76 for rotating the rotation shaft 72. The cylindrical body 70 includes a proximal end 82, a distal end 84 located further away from the handle 76 than the proximal end 82, and a geometry axis o-o' (referring to FIG. 5). In some embodiments, the outer diameter of the cylindrical body 70 is sized to allow the cylindrical body 70 to have a snug fit leaving a slight clearance 83 with one of the tube holes 340. The cylindrical body 70 also includes the shoulder 35 that is configured to limit axial movement of the cylindrical body 70 in a direction toward the distal end 84. The shoulder 35 can be formed integrally with the cylindrical body 70 or separately from the cylindrical body 70 and secured to the cylindrical body 70 by a fastener.

Still referring to FIG. 1, cylindrical body 70 of the cutter carrier member 14 can also include a locking mechanism 60 for preventing movement of the cylindrical body 70 relative to the shoulder 35. In some embodiments, the locking mechanism 60 can take a form of a threaded aperture 64. The threaded aperture 64 can be defined transversely in the shoulder 35 to receive a fastener 66, such as a screw, that secures the shoulder 35 to the cylindrical body 70.

The rotation shaft 72 has a proximal end 74 connected to the handle 76 and a distal end 78 opposite to the proximal end 76. In some embodiments, a cutting wheel holder 90 holds a cutter which may be a cutting wheel 100 mounted on the cutting wheel holder 90 is attached to the distal end 78 of the rotation shaft 72. The rotation shaft 72 has a rotation axis x-x' (referring to FIG. 5). The rotation axis x-x' is eccentrically offset from the geometry axis o-o'. When used herein, the term "eccentrically" or "eccentric" means that the rotation axis x-x' of the rotation shaft 72 where the cutting wheel 100 is attached, and the geometry axis o-o' of an elongate body of the carrier member 14, are not aligned substantially in a straight line.

The cutting wheel holder 90 includes a receiving channel 92 that receives the cutting wheel 100, where the cutting wheel 100 is rotatably mounted on the holder 90 by a pin 94. The holder 90 can be in contact with the distal end 84 of the cylindrical body 70 or alternatively spaced away from the distal end 84.

Referring to FIGS. 2-5, the cutting wheel holder 90 can be positioned in a non-extended position, such as a folded position, when extending through one of the tube holes 340, and an extended position, such as a cutting position, for cutting. Because of the eccentric configuration of the rotation axis x-x' of the rotation shaft 72 relative to the geometry axis o-o' of the cylindrical body 70, at least a portion of the cutting wheel holder 90 can be extended outside the dimension defined by an outer diameter 86 of the cylindrical body 70. This allows the cutting wheel 100 to project or extend outwardly from the cylindrical body 70 to be able to engage and cut the target tube 300.

Referring back to FIG. 1, optionally, the tube cutting device 10 may include alignment marks 68 to allow accurate determination of the position of the cutting wheel 100 relative to the target tube 300 held by the tube holding member 12. Specifically, when the tube holding member 12 clamps on the target tube 300 from the inside, the rotation rod 22 is axially adjusted relative to the cutter carrier member 14 based on the alignment marks 68, thereby aligning the target tube 300 with the cutting wheel 100 for cutting.

When in use, a distal end of the tube holding member 12 and a distal end of the cutter carrier member 14 may be extending through one of the tube holes 340 of the tubesheet 310 and have a snug fit leaving slight clearances 33, 83 with the tube hole 340. In some embodiments, the tube holes 340 of the tubesheet 310 have generally the same diameter. As a result, at least a portion (engagement portion 110) of the tube holding member 12 and at least a portion (engagement portion 112) of the cutter carrier member 14 have generally the same diameter. Also, to allow the tube holding member 12 and the cutter carrier member 14 to extend through the tubesheet 310, the portion between the distal end of the tube holding member 12 and the engagement portion 110 of the tube holding member 12, and the portion between the distal end of the cutter carrier member 14 and the engagement portion 112 of the cutter carrier member 14 have generally the same or smaller diameter than the diameter of the engagement portions 110, 112.

Referring next to FIGS. 1 and 6, a tube cutting device 110 can be constructed to include one or more retention members 116 for retaining a tube holding member 112 or a cutter carrier member 114 in place with the tubesheet 310. In some embodiments, the retention member 116 takes a form of an adjustable bracket 160. The adjustable bracket 160 includes first and second arms 162, 164, and a connection section 166 connecting the first and second arms 162, 164. The first arm 162 includes a first free end 168 and a first inner surface 170; the second arm 164 includes a second free end 172 and a second inner surface 174. A holder section 176 is formed adjacent the free ends 168, 172. The holder section 176 includes first and second concaves 178, 180 sized to clamp on an outer surface of the positioning sleeve 28 or the cylindrical body 70. A channel 182 extending between the connection section 166 and the holder section 176 is defined between the first and second arms 162, 164.

Still referring to FIG. 6, the adjustable bracket 160 also includes an insert member 184 movable along the channel 182 between the connection section 166 and the holder section 176. The insert member 184 can be inserted into one of the tube holes 340 on the tubesheet 310 and can have a snug fit leaving a slight clearance with the tube hole 340. Alternatively, the insert member 184 can have a interference fit with the tube hole 340 so that the adjustable bracket 160 can be retained to the tubesheet 310 more securely.

The insert member 184 is maintained in the channel 182 by a rib 186 formed on the inner surfaces 170, 174 of the arms 162, 164. The adjustable bracket 160 also includes a width adjustment mechanism 188 which can adjust the distance between the inner surfaces 170, 174 of the first and second arms 162, 164.

The present invention may be embodied in other specific forms without departing from the spirit or essential attributes thereof. It is, therefore, desired that the present embodiment be considered in all respects as illustrative and not restrictive, reference being made to the appended claims rather than to the foregoing description to indicate the scope of the invention.

The invention claimed is:

1. A tube cutting system, comprising:
a tube holding member having a radially adjustable outer diameter fittable inside a target tube, the tube holding member being configured to hold the target tube from an inside of the target tube, allowing the target tube to be cut from an outside; and
a cutter carrier member including an elongate body and a cutting wheel holder attached to the elongate body, a cutting wheel being secured to the cutting wheel holder at a rotation axis of the cutting wheel, the cutting wheel holder being pivotable about a pivotal axis, the pivotal axis being eccentric relative to a central longitudinal axis of the elongate body, such that when in a non-extended position, the cutting wheel is entirely positioned within a diameter of the elongate body, and when in an extended position, at least a portion of the cutting wheel extends outwardly beyond the diameter of the elongate body, allowing the cutting wheel to cut into a wall of the target tube,
wherein the cutter carrier member further includes a shaft supporting the cutting wheel holder that is rotatable around the pivotal axis of the cutting wheel holder relative to the elongate body of the cutter carrier member, the pivotal axis being eccentrically offset from the longitudinal axis of the elongate body, and
wherein the tube holding member and the cutter carrier member are detached from each other, and
wherein an indentation is defined on a side face of the tube holding member with the indentation aligned in a longitudinal direction with the cutting wheel; when the cutting wheel is in the extended position, the cutting wheel is configured to extend sufficiently radially outward from the cutter carrier member such that the cutting wheel cuts through the target tube and passes at least partially into the indentation.

2. The tube cutting system of claim 1, further comprising a retention member having an inner diameter sized to receive and retain the tube holding member or the cutter carrier member in place.

3. The tube cutting system of claim 2, wherein the retention member is an adjustable bracket that has a holder section for holding the tube holding member or the cutter carrier member and an insert member for inserting in a tube hole defined in a tubesheet, the distance between the holder section and the insert member being adjustable.

4. The tube cutting system of claim 1, wherein the tube holding member and the cutter carrier member have generally the same diameter which allows each of the tube holding member and the cutter carrier member to extend through tube holes of a tubesheet.

5. The tube cutting system of claim 1, wherein a clearance is formed between an outer surface of an expanding sleeve of the tube holding member and an inner surface the target tube, thereby allowing the target tube to be cut through while avoiding damaging the expanding sleeve.

6. The tube cutting system of claim 1, wherein the tube holding member or the cutter carrier member includes alignment marks for accurate positioning of a cutting wheel mounted on the cutter carrier member relative to the target tube held by the tube holding member.

7. The tube cutting system of claim 1, wherein the tube holding member includes a locking mechanism for preventing movement of an expanding sleeve relative to a positioning sleeve.

8. The tube cutting system of claim 1, wherein the longitudinal axis of the elongate body of the cutter carrier member, the pivotal axis of the cutting wheel holder and the rotation axis of the cutting wheel are oriented parallel relative to each other.

9. A method for cutting a tube, comprising:
obtaining a tube cutting system comprising:
a tube holding member having a radially adjustable outer diameter fittable inside a target tube, the tube holding member being configured to hold the target tube from an inside of the target tube, allowing the target tube to be cut from an outside; and
a cutter carrier member including an elongate body and a cutting wheel holder attached to the elongate body, a cutting wheel being secured to the cutting wheel holder at a rotation axis of the cutting wheel, the cutting wheel holder being pivotable about a pivotal axis, the pivotal axis being eccentric relative to a central longitudinal axis of the elongate body, such that when in a non-extended position, the cutting wheel is entirely positioned within a diameter of the elongate body, and when in an extended position, at least a portion of the cutting wheel extends outwardly beyond the diameter of the elongate body, allowing the cutting wheel to cut into a wall of the target tube,
wherein the cutter carrier member further includes a shaft supporting the cutting wheel holder that is rotatable around the pivotal axis of the cutting wheel holder relative to the elongate body of the cutter carrier member, the pivotal axis being eccentrically offset from the longitudinal axis of the elongate body, and
wherein the tube holding member and the cutter carrier member are detached from each other, and
wherein an indentation is defined on a side face of the tube holding member with the indentation aligned in a longitudinal direction with the cutting wheel; when the cutting wheel is in the extended position, the cutting wheel is configured to extend sufficiently radially outward from the cutter carrier member such that the cutting wheel cuts through the target tube and passes at least partially into the indentation;
extending the tube holding member through a first tube hole defined in a tubesheet;
advancing the tube holding member into the target tube;
holding on an inner surface of the target tube by the tube holding member;
pivoting the cutting carrier member to the non-extended position, such that the entire cutting wheel cutter is positioned within the diameter of the elongate body, so as to allow the cutter carrier member to be extended through a second tube hole defined in the tubesheet;
pivoting the cutting carrier member to the extended position, such that at least a portion of the cutting wheel extends outwardly beyond the diameter of the elongate body; and cutting the target tube,
wherein each of the tube holding member and the cutter carrier member has a diameter which allows each of the tube holding member and the cutter carrier member to extend through the first and second tube holes, respectively, of the tubesheet.

10. The method of claim 9, further comprising:
holding one of the tube holding member and the cutter carrier member at a holder section of an adjustable bracket; and
adjusting a distance between the holder section and an insert member so that the insert member is inserted in a third tube hole defined in the tubesheet.

11. The method of claim 9, further comprising: retaining the tube holding member or the cutter carrier member in place by a retention member.

12. The method of claim 11, wherein the retention member is an adjustable bracket that has a holder section for holding the tube holding member or the cutter carrier member and an insert member for inserting in a third tube hole defined in the tubesheet, the distance between the holder section and the insert member being adjustable.

13. The method of claim 9, wherein the tube holding member and the cutter carrier member have generally the same diameter which allows each of the tube holding member and the cutter carrier member to extend through one of the tube holes of the tubesheet.

14. The method of claim 9, further comprising: maintaining a clearance between an outer surface of an expanding sleeve of the tube holding member and an inner surface the target tube, thereby allowing the target tube to be cut through while avoiding damaging the expanding sleeve.

15. The method of claim 9, further comprising: positioning of the cutting wheel mounted on the cutter carrier member relative to the target tube held by the tube holding member by aligning the tube holding member with the cutter carrier member by alignment marks.

16. The method of claim 9, further comprising: preventing movement of an expanding sleeve relative to a positioning sleeve by a locking mechanism.

* * * * *